United States Patent [19]

McCaskill et al.

[11] Patent Number: 5,121,499

[45] Date of Patent: Jun. 9, 1992

[54] METHOD FOR CONTROLLING THE ORDER OF EDITING CELLS IN A SPREADSHEET BY EVALUATING ENTERED NEXT CELL ATTRIBUTE OF CURRENT CELL

[75] Inventors: Rex A. McCaskill; Beverly H. Machart; Harry E. O'Steen, all of Travis County, Tex.

[73] Assignee: International Business Machines Corp., Armonk, N.Y.

[21] Appl. No.: 735,698

[22] Filed: Jul. 25, 1991

Related U.S. Application Data

[63] Continuation of Ser. No. 739,368, May 30, 1985, abandoned.

[51] Int. Cl.⁵ ............................................. G06F 13/00
[52] U.S. Cl. ......................... 395/700; 364/DIG. 2; 364/419; 364/943; 364/943.1; 364/948.2
[58] Field of Search ............ 364/419, 200 MS File, 364/900 MS File

[56] References Cited

U.S. PATENT DOCUMENTS

| | | | |
|---|---|---|---|
| 4,470,129 | 9/1984 | Disbrow et al. | 364/900 |
| 4,520,457 | 5/1985 | Hagler et al. | 364/900 |
| 4,586,158 | 4/1986 | Brandle | 364/900 |
| 4,633,430 | 12/1986 | Cooper | 364/900 |
| 4,646,250 | 2/1987 | Childress | 364/518 |

FOREIGN PATENT DOCUMENTS

0075742 9/1982 European Pat. Off.

OTHER PUBLICATIONS

"Implicit Object Definition In a Multiple Data Editor"; Barker et al; IBM Technical Disclosure Bulletin, vol. 27, No. 10B, Mar. 1985; p. 6002.
"Interactive Forms Positioning with Delayed Print"; Colnen et al; IBM Technical Disclosure Bulletin, vol. 19, No. 8, Jan. 1977; p. 2821.
"Form Log and Printing"; Cook et al; IBM Technical Disclosure Bulletin, vol. 18, No. 11, Apr., 1976; p. 3552.
Manual of "The Smart Spreadsheet with Graphics", pp. 13-192, 13-194, copyright Jun., 1984, published by Innovative Software, Inc.
William Doyle, in "Using Supercalc, The Next Generation" published by John Wiley & Son, Inc. 1985.
Lotus 1-2-3 User's Manual, 1983, pp. 109, 110, 157, 158, 341.
Barlett et al., "Table Processing," Jan. 1984, IBM Technical Disclosure Bulletin, vol. 26, No. 8, pp. 4349-4354.

*Primary Examiner*—Thomas C. Lee
*Assistant Examiner*—L. Donaghue
*Attorney, Agent, or Firm*—Whitham & Marhoefer

[57] ABSTRACT

A mechanism allows for programming the order of cells for an operator to enter data in a spreadsheet. Each cell of the spreadsheet may be provided with a "next cell" attribute, and these attributes as well as other attributes for the cells are stored in a table. The "next cell" attribute may be a constant, such as the name of the next cell, or it may be a logic expression so that the next cell to be edited can be different depending on some condition. When the operator presses the NEXT CELL key, the "next cell" attribute is searched by accessing the attribute table, and if a "next cell" attribute is found, it is evaluated to determine the next cell to be edited.

6 Claims, 7 Drawing Sheets

METHOD FOR CONTROLLING THE ORDER OF EDITING CELLS IN A SPREADSHEET BY EVALUATING ENTERED NEXT CELL ATTRIBUTE OF CURRENT CELL

CROSS REFERENCE TO RELATED APPLICATIONS

This is a continuation of Ser. No. 739,368 filed May 30, 1985, abandoned.

The invention disclosed in this application is related in subject matter to the inventions disclosed in the following patent applications which are assigned to the assignee of this application:

Ser. No. 06/645,622 filed Aug. 30, 1984, by Barbara A. Barker and Rex A. McCaskill for "Superblock Structure in a Multiple Data Editor", now U.S. Pat. No. 4,723,210;

Ser. No. 06/645,620 filed Aug. 30, 1984, by Barbara A. Barker and Irene H. Hernandez for "Implicit Creation of a Superblock Structure", now U.S. Pat. No. 4,739,477; and Ser. No. 06/645,630 filed Aug. 30, 1984, by Barbara A. Barker, Irene H. Hernandez and Rex A. McCaskill for "Editing of a Superblock Structure", now U.S. Pat. No. 4,723,211.

The disclosures of the foregoing patent applications are incorporated herein by reference.

TECHNICAL FIELD

The present invention generally relates to data editors and, more particularly, to a technique for linking a cell in a spreadsheet to the "next cell" in the spreadsheet for facilitating data entry and editing in a spreadsheet application. The invention has particular application in a multiple data editor characterized by a superblock construction containing two or more diverse object sets; however, the technique according to the invention can be advantageously applied to spreadsheet applications in general and is therefore not limited to multiple data editors.

DESCRIPTION OF THE PRIOR ART

Spreadsheet applications or programs have come into wide use on personal computers and are used for budgeting, financial forecasting, profit-and-loss statements as well as many other accounting applications. The "electronic spreadsheet" generated by such a program can be considered to be analogous to an accountant's ledger sheet having many rows and columns in which data are entered. Certain columns may be mathematically linked so that data entered in a row of one column and data entered in the same row of another column generate data in that row of yet another column. Thus, for example, the first column might be an interest rate, the second column might be the principal amount, and the third column might be the interest amount computed by multiplying the interest rate times the principal amount. Further, the amounts in the principal amount column and the amounts in the interest amount column might be summed to provide total amounts. This, of course, is but a simple example to illustrate the use of a spreadsheet in general, and the description is equally applicable to hand entry of data in a ledger sheet or the data entered by a keyboard into the spreadsheet application. The advantage of the latter is that the computations, once defined by the user, are all automatic as data is entered into the first two columns in the example described and, if data is changed or deleted in the course of editing the spreadsheet, all computations that are effected by the changes or deletions are automatically recomputed.

In existing spreadsheets, however, there is no method for programming the order of cells for an operator to enter data. In a large, complex model, it is desirable (even for the originator of the model) to direct the user to the cells in which data is to be entered and to specify the order of entry. By cells, what is meant the various intersections of rows and columns of the spreadsheets. These may be of various sizes as defined by the originator of the model to accomodate the expected number of characters that may need to be entered into a particular cell.

SUMMARY OF THE INVENTION

It is therefore an object of the subject invention to provide a technique for programming the order of cells for an operator to enter data in a spreadsheet.

It is another object of the invention to provide a method to direct the user to the cells in which to enter data and to specify the order of entry of the data in a spreadsheet program.

It is a further object of the invention to provide the spreadsheet editor of a multiple data editor with a way in which the order of data entry and/or editing of cells in a spreadsheet can be specified by the originator of the model represented by the spreadsheet.

According to the invention, a mechanism is provided to link a cell to the "next cell" to be edited. The value placed in the "next cell" parameter may be a constant such as the name of another cell. However, the value may also be a logic expression so that the next cell to edit can be different depending on some condition. This mechanism can be used to set "edit paths" that can merge, cross, or follow any pattern desired. Multiple paths can also be defined. By using a system defined indicator (such as a specific keystroke) to go to the next cell, the operator can move through the spreadsheet on a path, or simply choose to use the keys that move to adjacent cells.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

In the multiple data editor described, for example, in the above-referenced U.S. Pat. No. 4,723,210, table is the name given to an object set that consists of a symmetrical arrangement of cells which form a rectangular pattern consisting of rows and columns on the display. Thus, a table object set is defined as a collection of cells arranged in rows and columns, and such an object set includes a spreadsheet as defined above. A cell is the smallest object in the table object set, and the contents of a cell may include formulas, calculations, numeric values and textual data. As implemented in the multiple data editor, the invention is practiced by providing a NEXT CELL key which allows the user go to the cell named in the "Next Cell" attribute of the current cell. In designing the model for the spreadsheet, the originator supplies this attribute.

Figure 1:
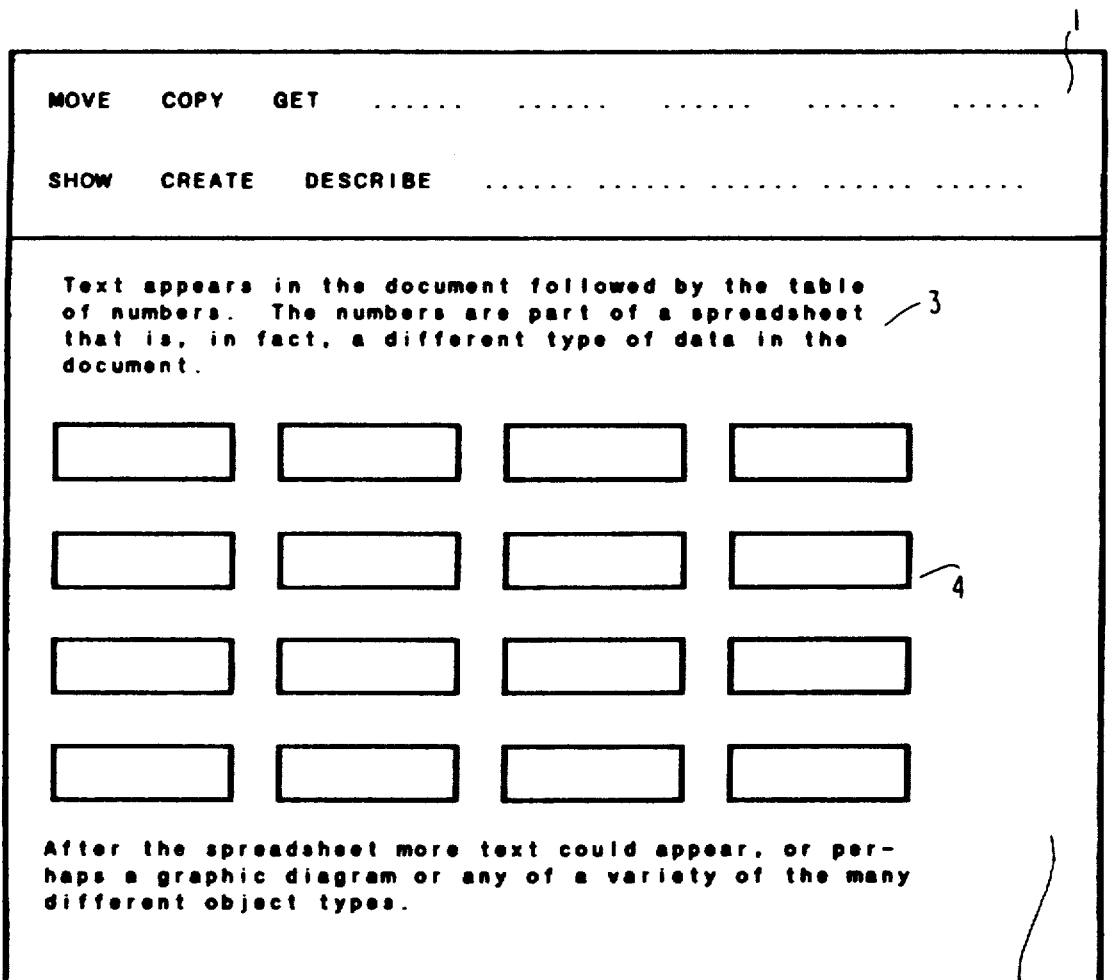
FIG. 1 illustrates the screen of a spreadsheet application that has a command area and a document area.
Figure 2:
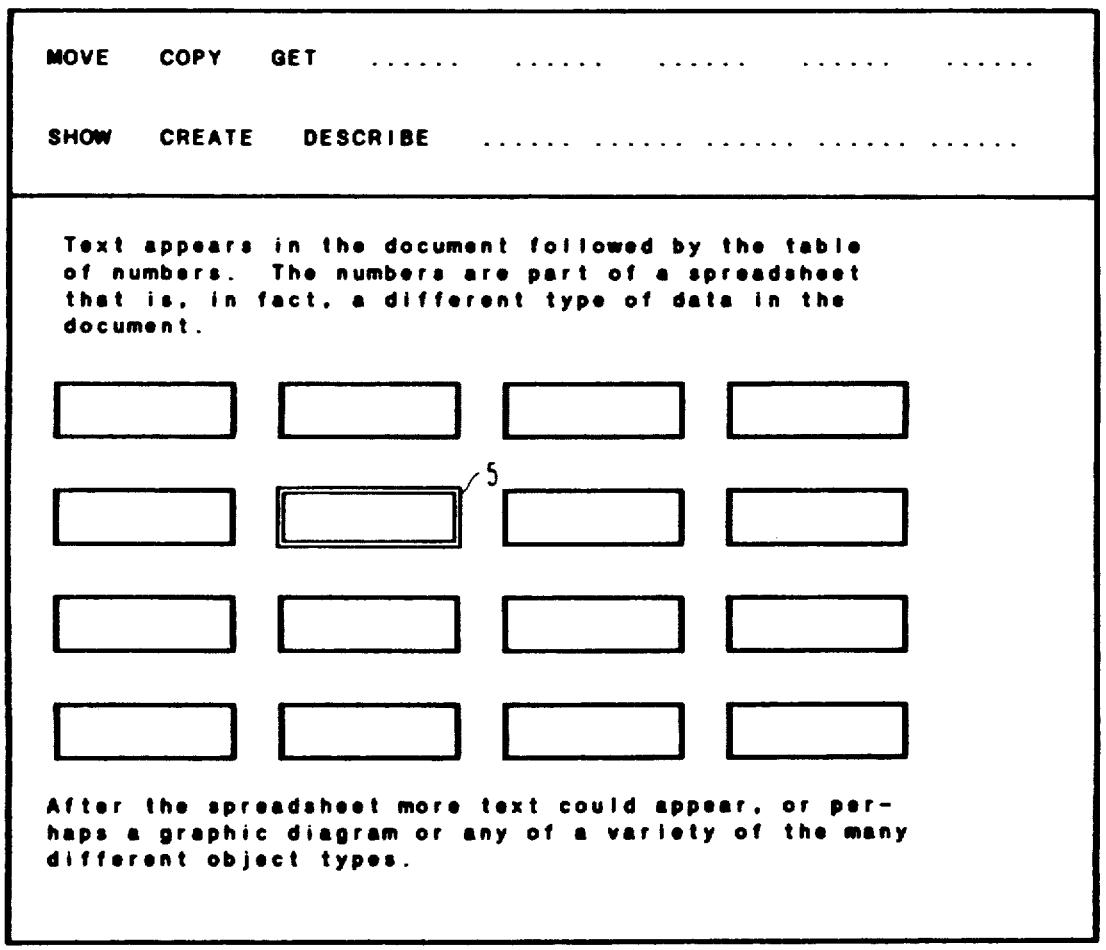
FIG. 2 illustrates the highlighting of one of the cells in the document area of the screen shown in FIG. 1.
Figure 3:
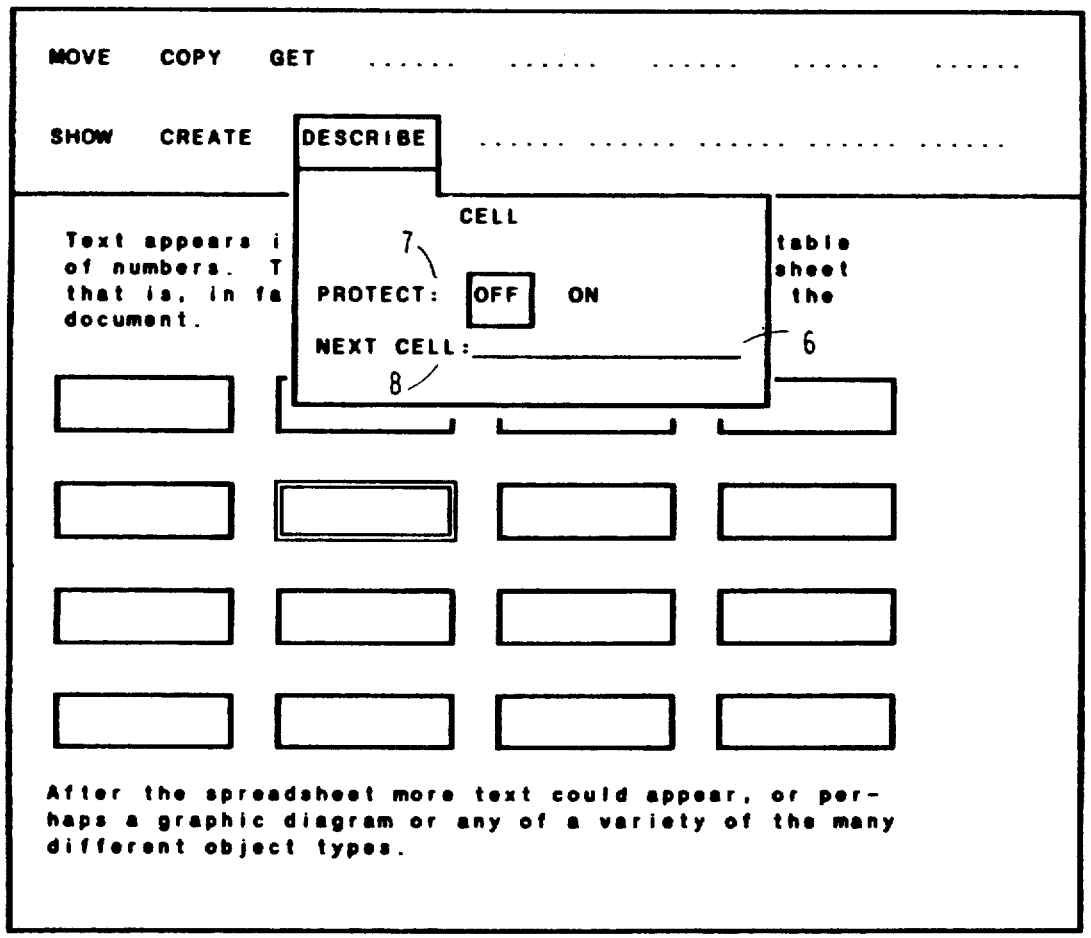
FIG. 3 shows the result of selecting the DESCRIBE command from the command area of the screen shown in FIG. 1.
Figure 4:
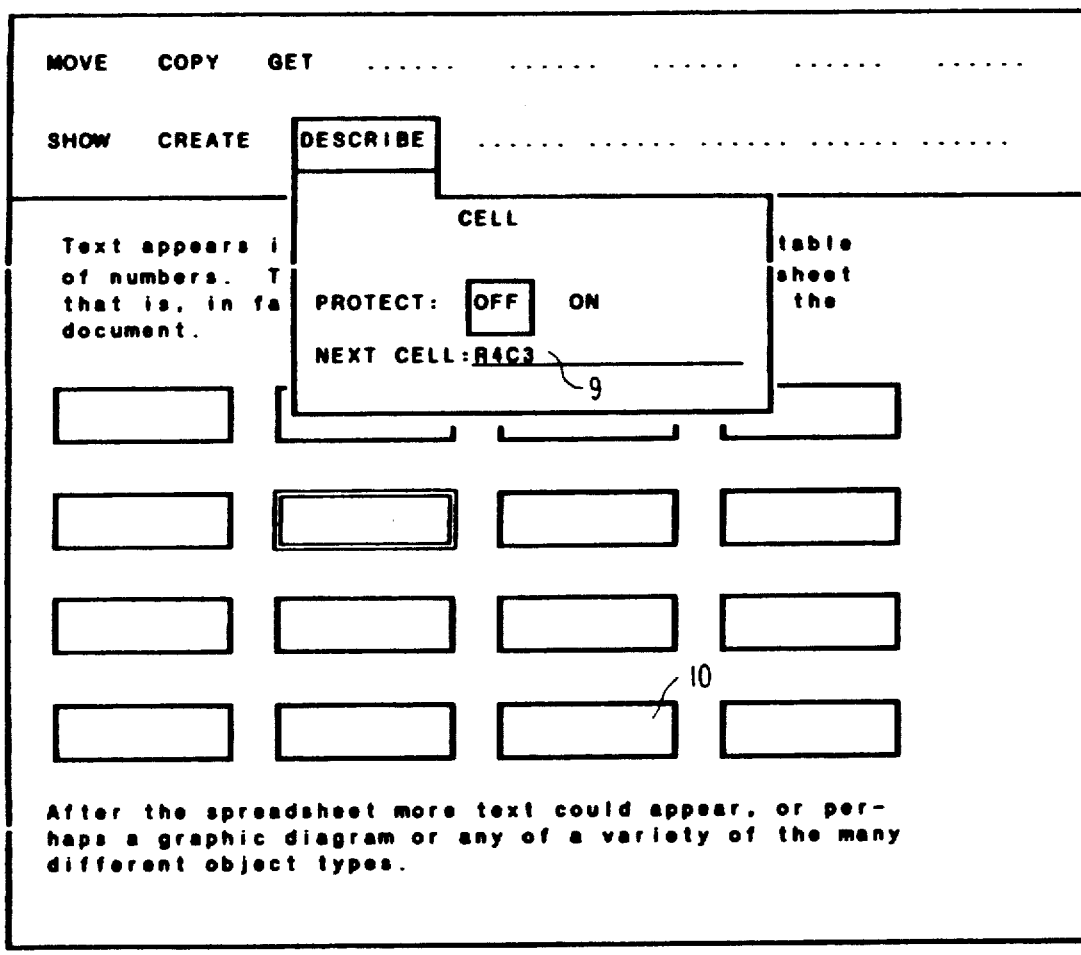
FIG. 4 shows the result of selecting the NEXT CELL property in the screen shown in FIG. 3.

FIG. 1 illustrates the screen of a spreadsheet application that has a command area 1 and a document area 2. Inside the document area is text data 3 followed by spreadsheet data 4 which, in turn, is followed by more text data. It will be observed that the spreadsheet data is represented by an array of rectangles. These rectangles represent the cells of the spreadsheet as described above. FIG. 2 illustrates the highlighting of one of the cells of the spreadsheet data. In this figure, the highlighting is represented by a cell 5 drawn with double lines; however, those skilled in the art will understand that highlighting on a display screen can take any of a number of different forms including reverse video, increased intensity, or a change in color. The highlighted cell is in the second row and second column and has the a default name of R2C2, meaning that the cell is located in row 2 and column 2. FIG. 3 shows the result of selecting the DESCRIBE command after an object, in this case a cell of the spreadsheet, has been selected. A pop-down menu 6 is presented with the properties of the selected object. In this illustration, two of the types of properties are shown. Some properties such as the PROTECT property 7 for a cell are specified by selecting one of several options. Other properties such as NEXT CELL 8 are specified by a free-key input field that must then be interpreted by the program. FIG. 4 shows the result of selecting the NEXT CELL property and typing in the specification R4C3 at 9. This specification indicates that when the system designated method for moving to the next cell is used, the next cell to edit is cell 10 in row four, column three.

The following is a pseudocode description of an implementation of "cell linking". This description represents the logic of the implementation. The assumptions made for the purpose of this description are that a spreadsheet program has been implemented in such a way that each cell in the spreadsheet has certain attributes associated with it. Examples of attributes are protection, adjust, numeric formatting, and the like. As is well known in the data processing arts, such attributes are part of the data structure that define the cell. The particular attribute that is required for this invention is the "Next Cell" attribute mentioned above, and this too is part of the data structure of the cell. This attribute is used to indicate what cell should be edited (or made active) next when the NEXT CELL key is pressed by the operator. This is different from using cursor motion keys to indicate that the next cell to edit is in one of four directions relative to the currently edited cell. The assumption for the "Next Cell" attribute made for this description is that the attribute is a free key field, as shown in FIG. 3, in which the operator can enter an expression that, when properly evaluated, indicates the next cell to edit.

The "main" procedure below is representative of a spreadsheet program that would use the "find_next_cell" procedure. This procedure is written in Program Design Language (PDL) from which source and object code may be readily derived by a programmer of ordinary skill in the art.

```
PROCEDURE main
••••••••••••••••••••••••••••••••••••••••••••••••
•      PURPOSE: Control the order of editing cells in    •
•                     the spreadsheet.                   •
••••••••••••••••••••••••••••••••••••••••••••••••
Position the operating point to the first cell to
   process.
WHILE editing is to be done DO
   Edit the current cell.
   IF edit next cell is requested THEN
      Call FIND_NEXT_CELL
      If no error in finding next cell THEN
         Position operating point to the cell
            returned by FIND_NEXT_CELL.
      ELSE
         Post an error message indicating that the
            "next cell" expression is in error.
      ENDIF
   ELSE
      Process depending on method to use when "edit
         next cell" is not requested.
   ENDIF
ENDWHILE
```

Figure 5:
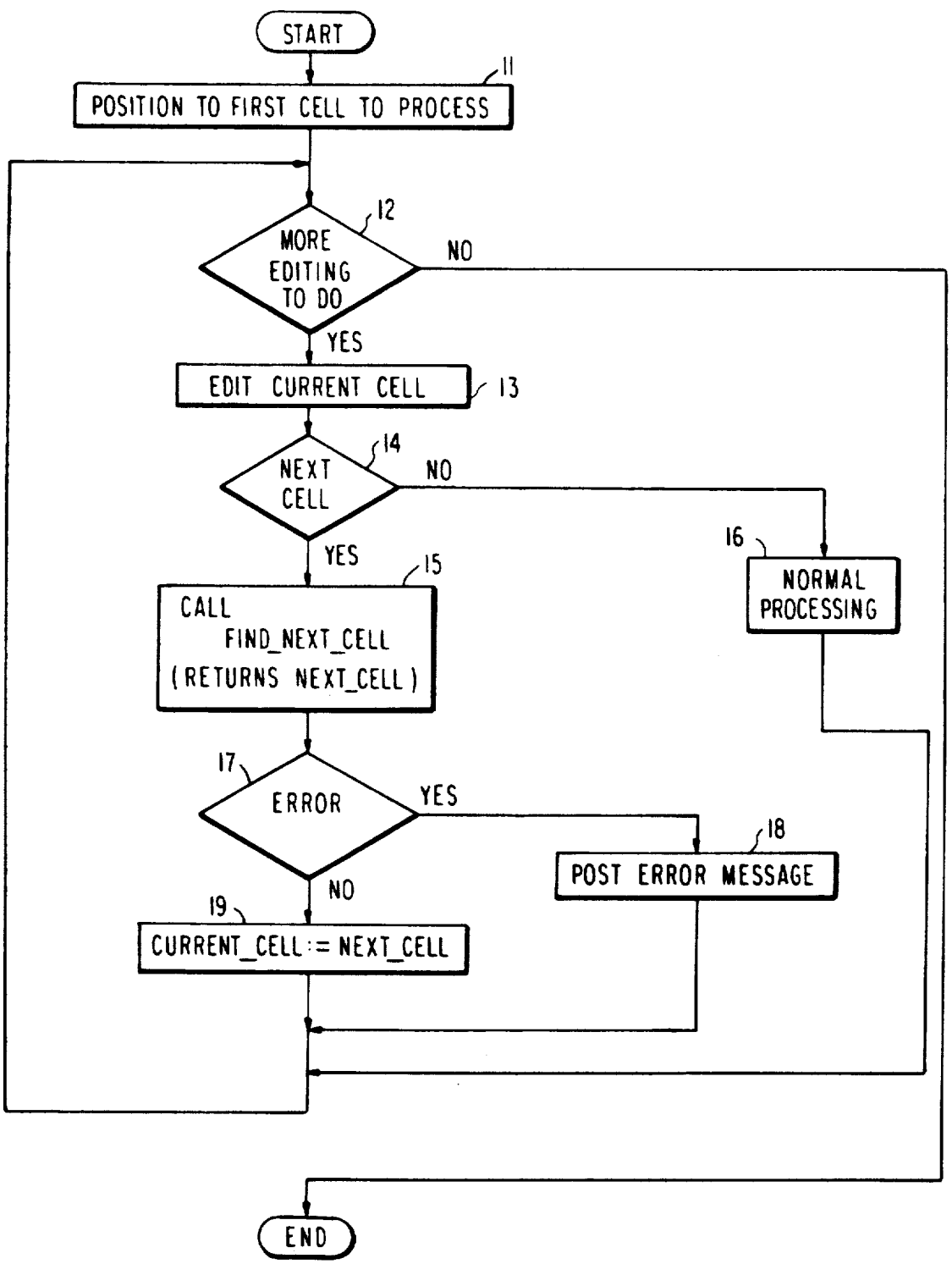
FIG. 5 is a flow chart showing the main procedure according to the invention.

FIG. 5 is the flow chart for the main procedure. This is the procedure that is in effect at the time the spreadsheet is being edited. The first cell to be processed, as determined by the system, is used as the cell to which the operating point is initially positioned, as indicated by block 11. The initial condition of spreadsheet editing is that this first cell is to be edited, so the system determines that there is more editing to do, as indicated by decision block 12, and begins the process of editing the cell in block 13. After the cell has been edited, the system must determine whether the next cell to edit is identified by the Next Cell property of the current cell. This is indicated by decision block 14. If not, then as indicated in block 16, the normal processing determines the next cell to edit, which could be dependent on the direction of cursor movement or an explicit selection by pointing. The process loops back to decision block 12, and it may be that at this time editing is complete. If this were the case, the process exits. However, on the other hand, if the Next Cell property is found in decision block 14, then a procedure is called to identify which cell is to be edited next. This is the function indicated in block 15. After the procedure is executed, a test is made in decision block 17 to see if an error condition exists. If not, then the identified cell is made the current cell as indicated in block 19. If an error occured, an error message is posted as indicated in block 18, and the current cell remains unchanged. In either case, the procedure loops back to decision block 12.

The PDL code for the procedure FIND_NEXT_CELL is listed below.

PROCEDURE FIND_NEXT_CELL

```
*****************************************************
*  PURPOSE      Find the next cell by using the "next   *
*               Cell" attribute                          *
*  INPUT        Current cell location in the            *
*               spreadsheet.                             *
*  OUTPUT       Return code indicating if a valid       *
*               next cell was found. The next cell      *
*               to edit                                  *
*****************************************************
Locate current cell attributes
Find the "next cell" attribute
Call EVALUATE_NEXT_CELL
IF a valid next cell found THEN
    Set return code to "valid cell found";
    Set next cell to edit to cell returned from
        EVALUATE_NEXT_CELL;
ELSE
    Set return code to "valid cell not found";
ENDIF
```

Figure 6:
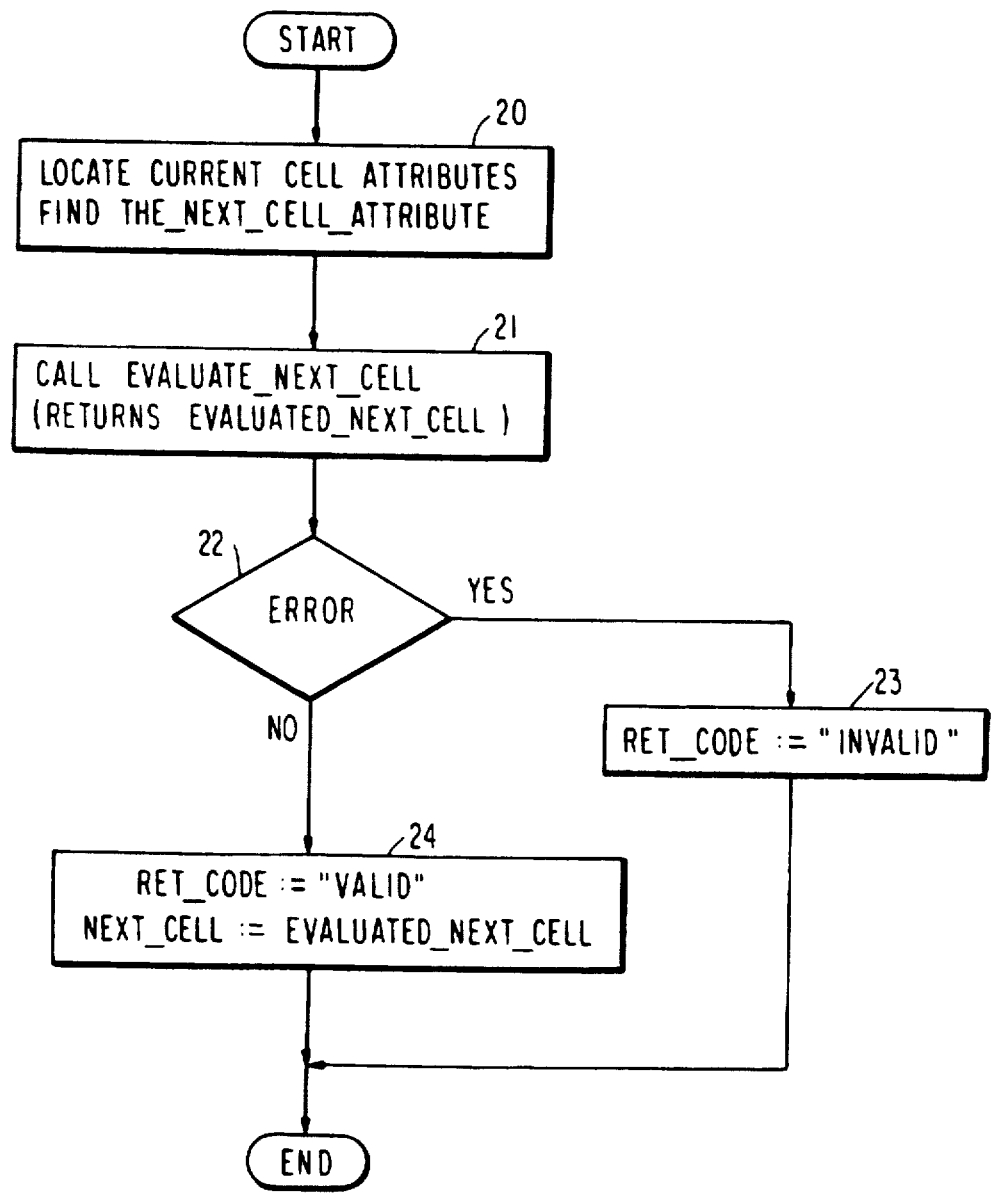
FIG. 6 is a flow chart showing the procedure for the subroutine FIND_NEXT_CELL which is called from the main procedure.

The flow chart for the procedure FIND_NEXT_CELL is shown in FIG. 6. This procedure is called to determine the next cell to edit as specified in the Next Cell property of the current cell. The current cell attributes are located and the Next_Cell attribute is located as indicated in block 20. The value for this attribute is a string that was specified by the operator through keying, pointing or some other means. This string is evaluated by calling the EVALUATE_NEXT_CELL procedure to parse the string and derive the identity of the next cell to edit as indicated in block 21. This procedure returns an error indicator which is tested in decision block 22. If the error indicator is true, then an invalid return code is returned to the calling program as indicated in block 23. On the other hand, if the error indicator is false, the identified cell can be returned to the calling program as indicated in block 24.

The PDL code listing for the procedure EVALUATE_NEXT_CELL is listed below.

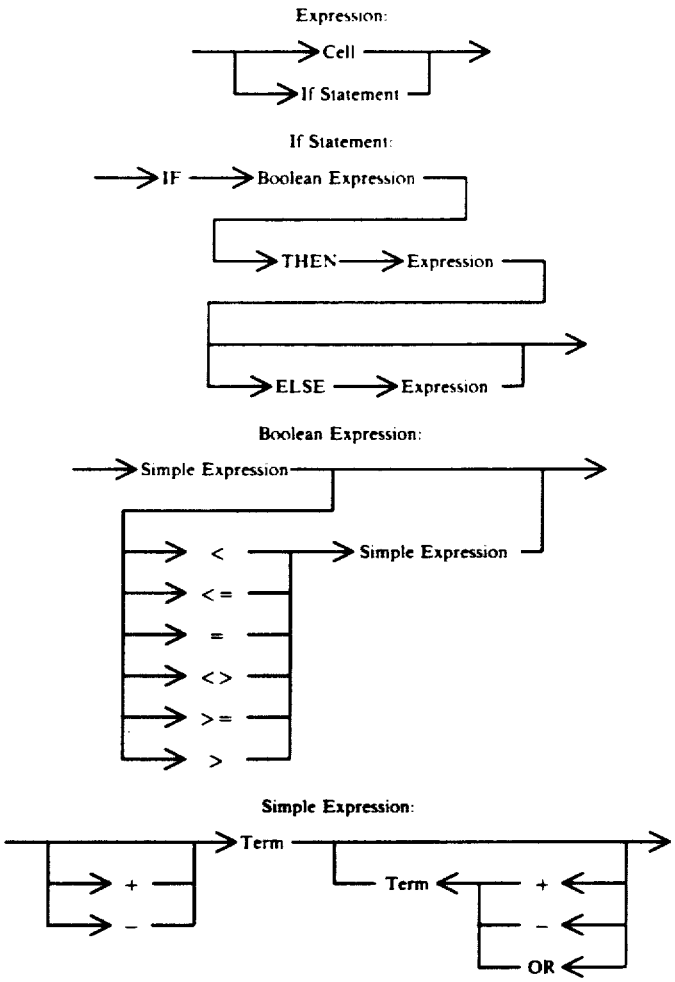

-continued

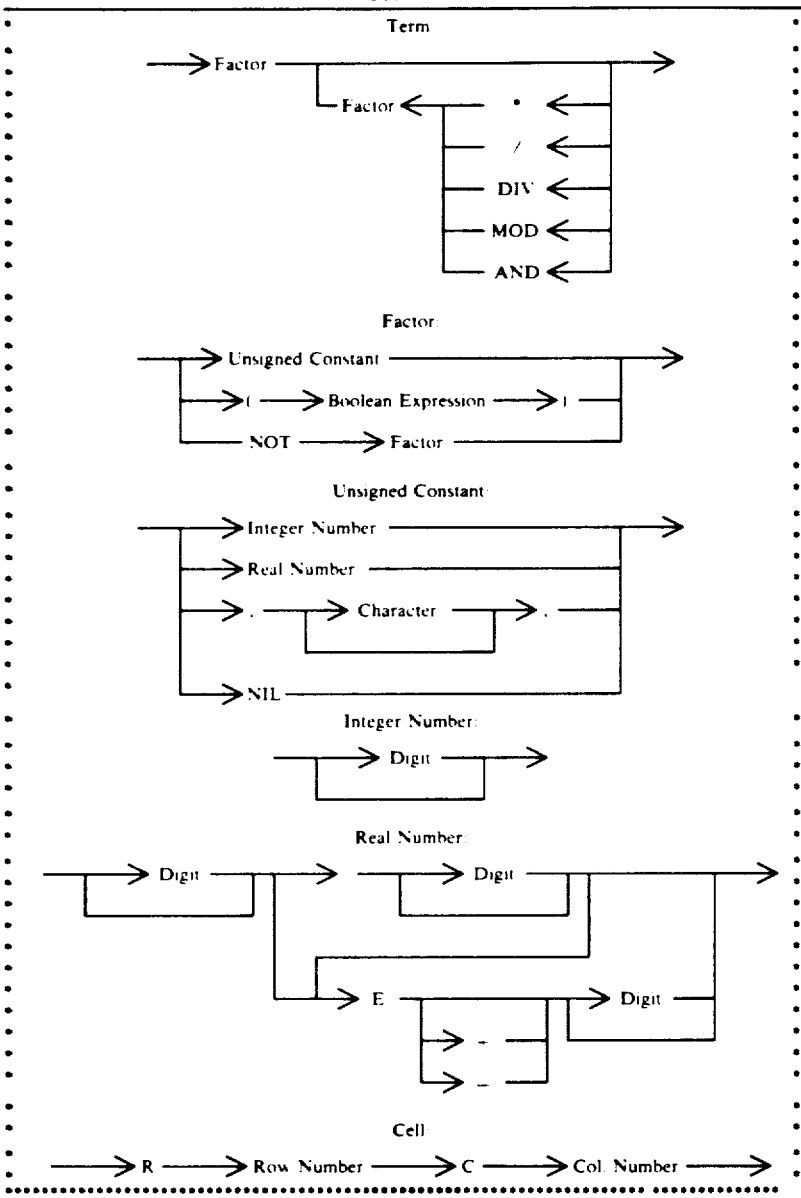

```
IF the expression with an "if statement" THEN
    Evaluate the boolean expression
    IF there is a syntax error in the boolean expression
        THEN set the return code to valid cell not found
    ELSE
        IF the boolean expression evaluated "true"
            THEN call EVALUATE_NEXT_CELL with the string
                between the "then" and "else"
            Pass back the return parameters returned
                from EVALUATE_NEXT_CELL
        ELSE
            Call EVALUATE_NEXT_CELL with the string
                after the "else"
            Pass back the return parameters returned
                from EVALUATE_NEXT_CELL
        ENDIF
    ENDIF
ELSE
    Check the remainder of the string for a valid cell syntax
    IF a valid cell syntax was found
        THEN return the cell name
        Set the return code to valid cell found
    ELSE
        Set the return code to valid cell not found
    ENDIF
```

-continued

ENDIF

Figure 7:
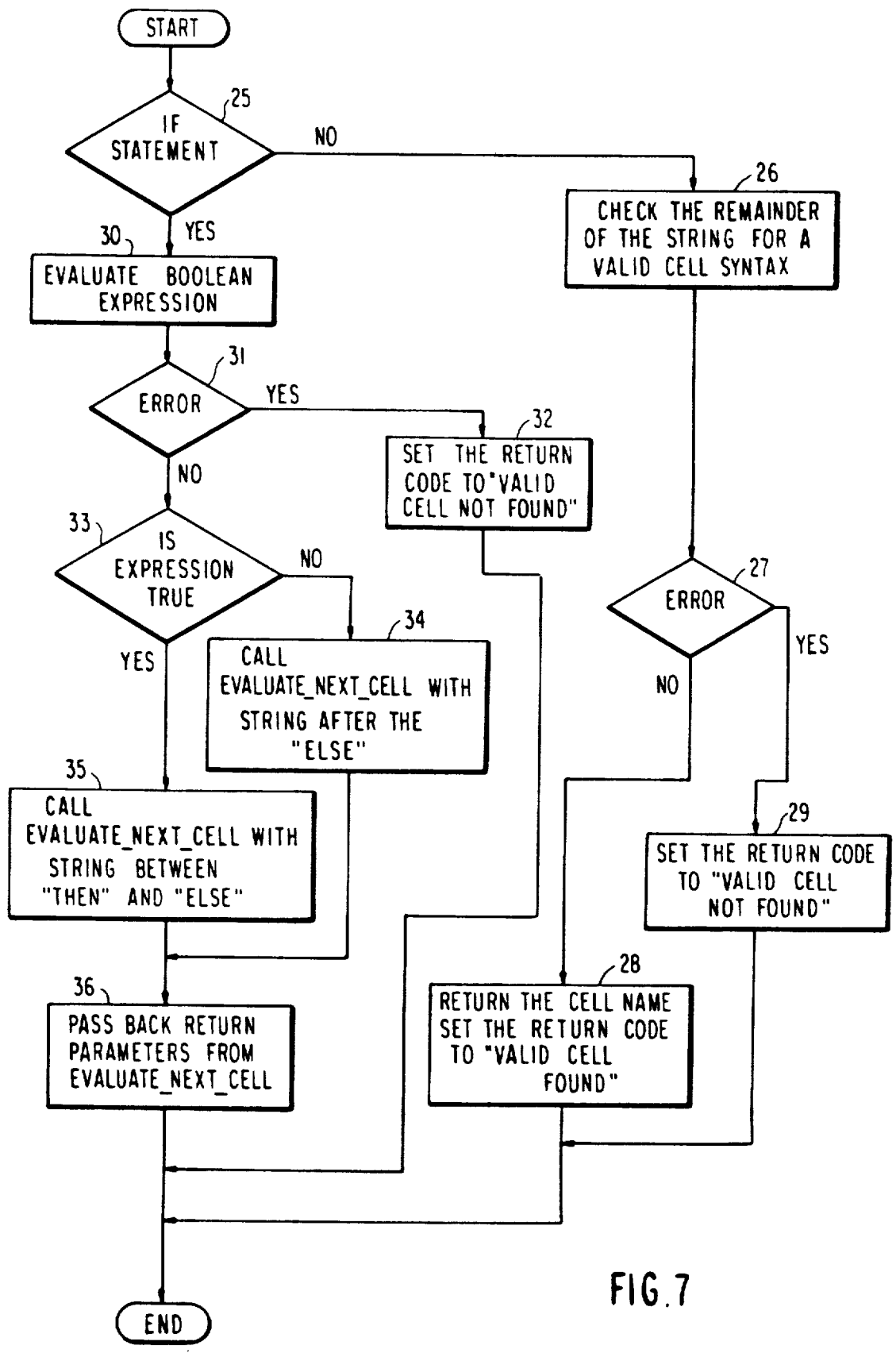
FIG. 7 is a flow chart showing the procedure for the subroutine EVALUATE_NEXT_CELL which is called from the subroutine FIND_NEXT_CELL.

The flow chart for the EVALUATE_NEXT_CELL procedure is shown in FIG. 7. This procedure examines the input string to determine the cell to be identified according to the syntax rules of the Next Cell attribute. The syntax is described in the PDL code given above for this procedure. First, a test is made in decision block 25 to determine if an "IF Statement" is contained in the string. If there is not an "IF Statement" in the string, then the remainder is examined in block 26 for valid syntax of a specific cell. In decision block 27, a test is made for a valid cell syntax. If a valid cell syntax is not found, then a return parameter is passed to the calling program indicating that a valid cell was not found as indicated in block 29. On the other hand, if a valid cell syntax is found, then a return parameter is passed to the calling program indicating that a valid cell was found and the name of the cell as indicated in block 28. In the case where the "IF Statment" is found in decision block 25, the boolean expression of the statement is evaluated as indicated in block 30. Since the expression may be in error, a test is made in decision block 31 so that a return parameter can be passed to the calling program to indicate that a valid cell was not found as indicated in block 32. If no error occured, then the expression evaluated is either True or False. This is tested in decision block 33. If the expression is True, then the following portion of the string between the THEN and ELSE parts of the IF statement is to be evaluated recursively by this same procedure as indicated in block 35. In the case where the expression is False, the portion of the string after the ELSE is to be evaluated as indicated in block 34. In either case, the return parameters from the recursive call are returned as the parameters to the calling program as indicated in block 36.

While the invention has been described in terms of a preferred embodiment, those skilled in the art will recognize that the technique employed may be modified and used without departing from the scope of the invention.

Having thus described my invention, what I consider novel and desire to secure by Letters Patent is set forth in the following claims:

1. A computer implemented method of setting up a spreadsheet application program on a computer, said application program displaying a spreadsheet comprising intersecting rows and columns forming cells of the spreadsheet, each of said cells being defined by a data structure accessed by said spreadsheet application program and evaluated by said computer for the processing of displayed data, wherein the order of data entry to the cells of the spreadsheet by a user is controlled by the computer so that a user of the spreadsheet application program is directed from a current cell to a next cell of the spreadsheet for the purpose of making entries int eh cells of the spreadsheet in an order in which data is to be entered comprising the steps of;

providing in said spreadsheet application program at least some of the cells of the spreadsheet with a "next cell" attribute as part of the data structure which defines the cell and which is evaluated by said computer to determine the next cell after the current cell for the entry of data;

accessing an attribute editing function of said spreadsheet application program;

entering data in fields of the data structure defining the "next cell" attribute of a selected plurality of cells of the spreadsheet to define said order of data entry to said selected plurality of cells of the spreadsheet;

responding to a next cell command from the user by evaluating the entered "next cell" attribute of the current cell to determine the next cell to edit; and moving to the next cell identified by the "next cell" attribute.

2. The method recited in claim 1 wherein the "next cell" attribute is a constant identifying a predetermined different cell in the spreadsheet.

3. The method recited in claim 1 wherein the "next cell" attribute is logic expression, said method further comprising the computer performed step of evaluating said logic expression to determine the identity of the next cell to edit in the spreadsheet.

4. The method recited in claim 1 further comprising the steps of:

accessing a first cell of said plurality of selected and edited cells;

locating cell attributes of a currently accessed cell;

evaluating said "next cell" attribute and, upon entry of data in said currently accessed cell, moving to a cell identified by said "next cell" attribute; and repeating said locating, evaluating and moving steps until data has been entered in all of said selected cells.

5. A computer implemented data entry method for an electronic spreadsheet running on a computer comprising the steps of:

providing the cells of the spreadsheet with a "next cell" attribute as part of the data structure which defines the cells;

accessing an attribute editing function for the spreadsheet application program for each of a plurality of selected cells of the spreadsheet;

inputting data in the "next cell" attribute data structure for said selected cells, which data defines an order of data entry for said selected cells of the spreadsheet;

accessing a first cell of said plurality of selected cells;

locating cell attributes of a currently accessed cell;

evaluating said "next cell" attribute and, upon entry of data in said currently accessed cell, moving to a cell identified by said "next cell" attribute; and repeating said locating, evaluating and moving steps until data has been entered in all of said selected cells.

6. The data entry method for an electronic spreadsheet recited in claim 5 wherein said data which defines an order of data entry comprises for at least one of said selected cells a Boolean expression which, when evaluated, identifies first or second cells of said plurality of selected cells of the spreadsheet, said method further comprising the steps of:

evaluating said Boolean expression ; and if said Boolean expression is true moving to said first cell; otherwise, moving to said second cell.

* * * * *